No. 796,088. PATENTED AUG. 1, 1905.
H. REISERT.
PURIFYING APPARATUS.
APPLICATION FILED DEC. 22, 1903.
3 SHEETS—SHEET 3.
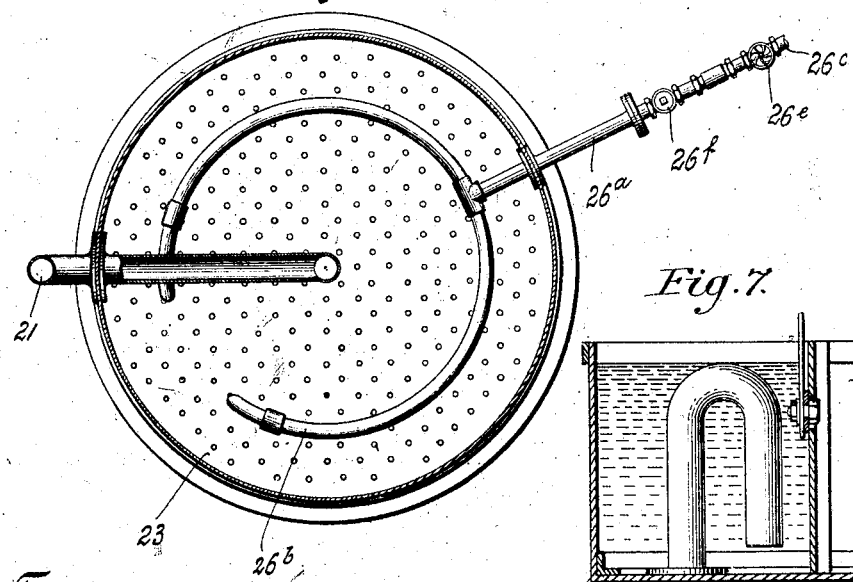
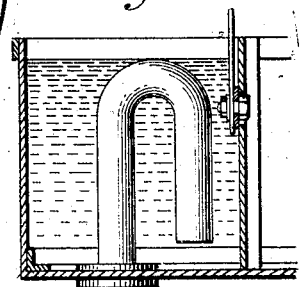
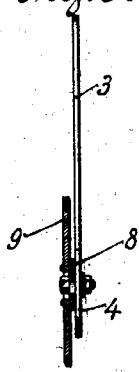
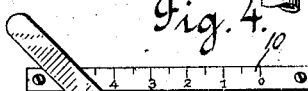
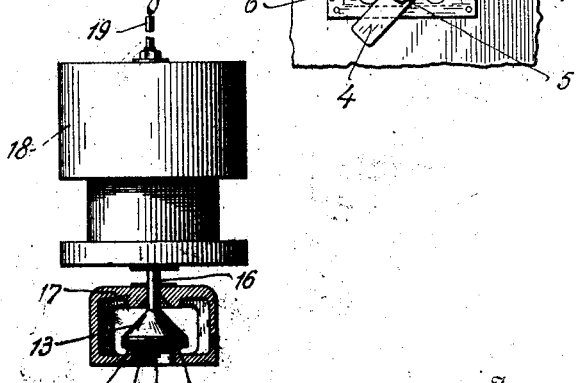
Witnesses
Inventor
Hans Reisert
By his Attorney
William F. Bissing

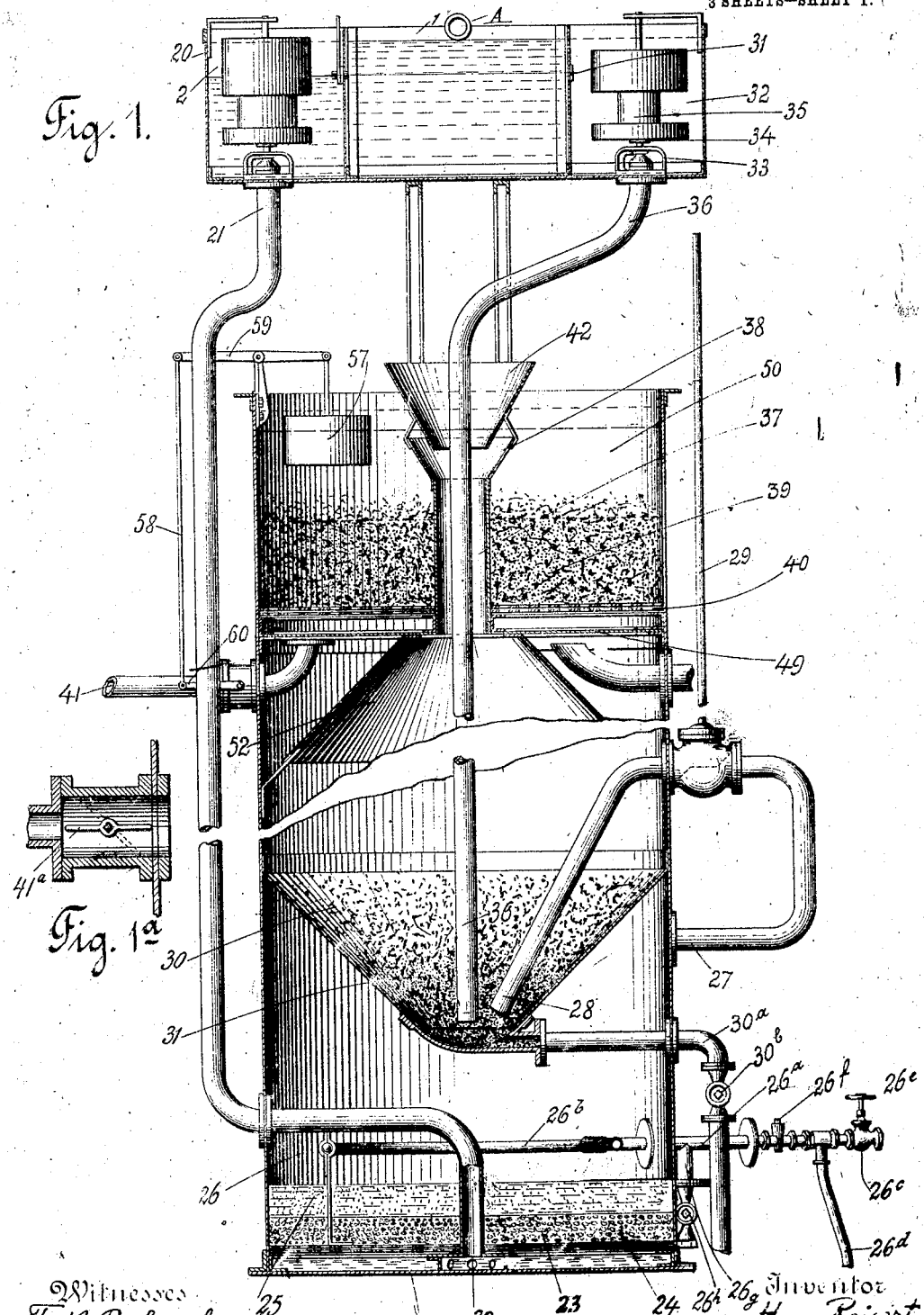

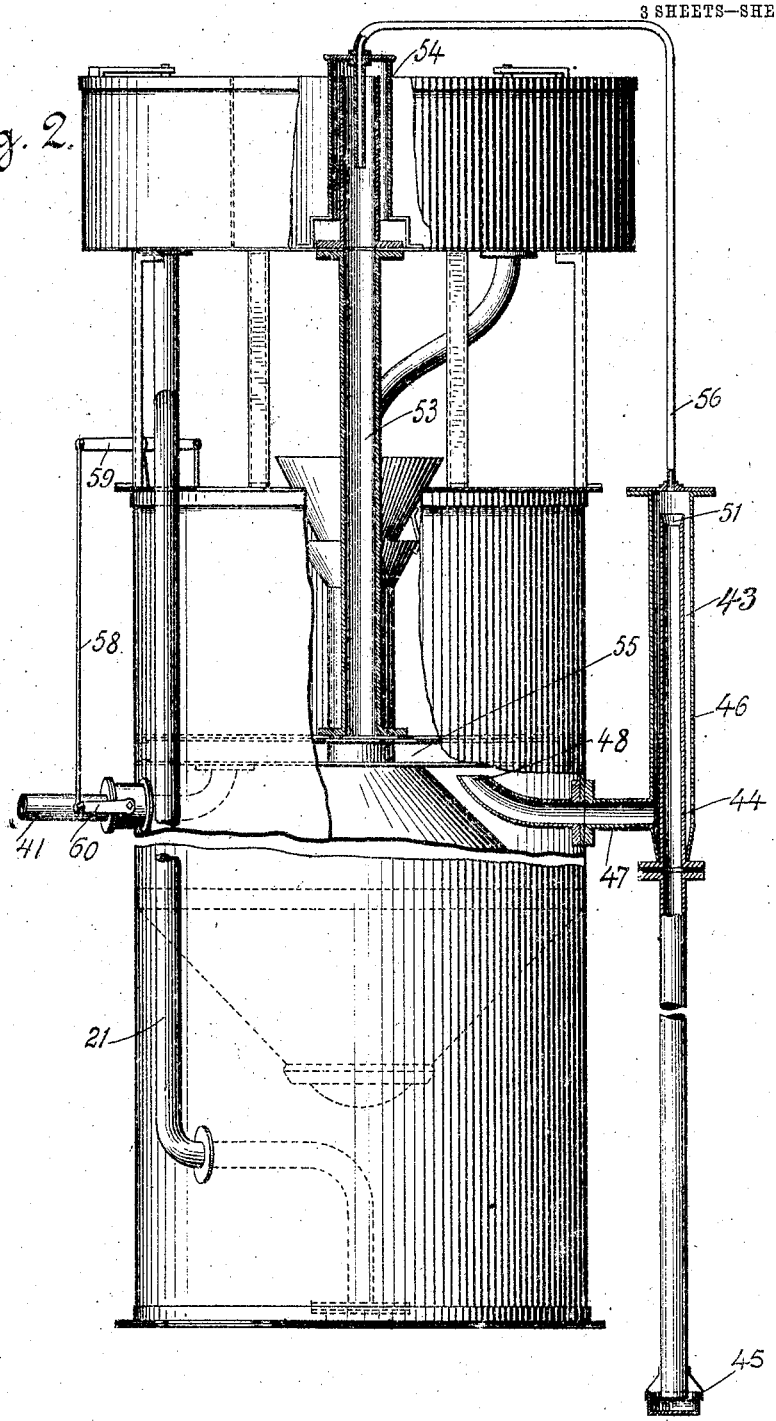

UNITED STATES PATENT OFFICE.

HANS REISERT, OF COLOGNE, GERMANY, ASSIGNOR TO HANS REISERT COMPANY, A CORPORATION OF GERMANY.

PURIFYING APPARATUS.

No. 796,088.　　　　Specification of Letters Patent.　　　　Patented Aug. 1, 1905.

Application filed December 22, 1903. Serial No. 186,176

*To all whom it may concern:*

Be it known that I, HANS REISERT, a citizen of the Empire of Germany, and a resident of Cologne, Germany, have invented certain new and useful Improvements in Purifying Apparatus, of which the following is a specification.

The object of my invention is to provide a purifying apparatus to be used in the purification of water or other liquids which will be free from complicated valve mechanisms and will do away entirely with valve mechanisms located at inaccessible parts of the apparatus.

A further object of my invention is to perform all the operations of stirring the water and of intermittently mixing the reagents to be used with the water by the force of the water itself without recourse to mechanical stirring devices.

A further object of my invention is to provide an improved form of charging-reservoir for charging water with lime, the reservoir being so constructed and the water supplied thereto in such manner that the lime will be thoroughly stirred without the use of mechanical stirrers.

A further object of the invention is to provide a means of filtering the water that has been treated by suitable reagents and for flushing and cleansing the filter.

A further object of the invention is to recover the reagent that has been supplied to the filter during the filtering operation.

A further object of the invention is to transmit the impulse of the water from the lime-charging apparatus to the decanting apparatus, so as to assist in thoroughly stirring the reagent contained in the decanter.

With these and other objects in view my invention consists in the novel parts, improvements, and combinations more particularly set forth in the claims.

Referring to the accompanying drawings, which are attached to the specification and form a part thereof, Figure 1 shows in vertical section a view of the water-purifying apparatus. Fig. 1ª shows a detail. Fig. 2 is an elevation, partly in section, showing particularly the cleansing means for the filter. Fig. 3 is a horizontal section of a part of the means for charging the water with lime. Fig. 4 is a view of the adjustable means for supplying water to the tanks. Fig. 5 is a section of part of the mechanism shown in Fig. 4. Fig. 6 is an elevation, partly in section, of the float-operated valve mechanism. Fig. 7 illustrates a modification.

The raw water or other liquid to be purified is received in a suitable tank 1, the water being preferably supplied thereto in a continuous stream by means of a pipe A. From the tank 1 the water is permitted to flow into the tank 2 through a suitable regulator. The form of regulator may be widely varied, one form being illustrated in Fig. 4. In the embodiment of the invention illustrated in the drawings the regulator consists of a handle 3, connected to the valve 4, which is pivoted to the bolt 5. When the handle 3 is thrown to the right in Fig. 4, it gradually closes the openings 6 and 7 made in the plate 8, and thus regulates the amount of water that can flow from the tank 1 into the tank 2. The plate 8 is secured to the wall 9, which separates the tank 1 from the tank 2. A scale 10, for which the handle 3 serves as an index, indicates the amount of closing of the openings 6 and 7 when the handle 3 has reached any desired position. The regulator is adjusted in accordance with the analysis of the liquid to be purified. According to the rate of flow through the regulator the supply of lime-water to the purifying apparatus is regulated, as will appear hereinafter. The liquid flowing into the tank 2 operates the device for intermittently supplying the liquid to the reagent in the charging apparatus. The form of this intermittently-operating supply device may be widely varied. A siphon, the mouth of which dips into the tank 2 and which is started in action when the water reaches the desired level in said tank, may, for example, be used. In the best embodiment of my invention I make use of the means illustrated in Figs. 1 to 6 of the drawings. In the apparatus the valve 11 normally rests upon the valve-seat 12. It is held upon the seat by any suitable means. I prefer to make use of the weight of the water above the valve, the gravity of the parts, and the unbalanced atmospheric pressure due to the escape-pipe 21. The part 11 preferably constitutes the face of the valve, this part being secured to the body 13 of the valve by a suitable washer 14 and pin 15. The body of the valve is guided in its movements by a stem 16, passing through a guiding-frame 17. The float 18, which is used to raise the valve under the action of the surrounding liquid, may be connected to the valve in any desired manner, the object being to transmit the buoyant force of the float to the parts to be moved. In the form of the invention shown in the drawings I connect the float directly to the valve 13 by means of the stem 16. The float is guided by a rod 19, which projects through an opening in the bracket 20. The operation of this part of the device is as follows: When the water rises in the tank 2, it finally reaches a level at which the buoyant effect of the liquid displaced by the float is sufficient to suddenly raise the float and the parts connected therewith. The buoyant effect of the liquid will then be sufficient to overcome the forces acting to seat the valve 13 against its seat. The water now discharges through the pipe 21 and enters beneath the valve 13. The valve, the float, and the attached parts are therefore free to assume a new position with relation to the surrounding liquid. The float being of low specific gravity will now tend to assume a higher position relative to the level of the liquid. The upward movement of the float is in the present instance limited by the bracket 20 or by the body 13 of the valve striking the conical recess in the frame 17. It is not until the water-level in the tank 2 has sunk so low that the buoyant effect of the float is too small to keep the valve open that the valve closes. As soon as the water has reached the low level just referred to the valve will close suddenly. This method of intermittently supplying the water to the charging-chamber I have found will avoid the deleterious introduction of air in large quantities into the apparatus. The pipe 21 is preferably made of sufficient height so that the effective column flowing through the pipe will acquire sufficient momentum to act impulsively at its discharge end 22, so as to thoroughly stir the reagent in the chamber 26. In order that this may be the case, the pipe must be of sufficient height so that the water column in it will overbalance the opposing water column in the purifying apparatus, the latter being of higher specific gravity than the former by reason of the reagents used. The water dashing out of the outlet 22 enters a suitable distributing device, the form of which may be widely varied. The object of this distributer is to supply the water to all parts of the reagent which is used in charging the water and to produce a complete and thorough solution thereof. The reagent used is preferably lime, and the solution is preferably saturated. I have shown a distributing-plate 23 for coarse distribution, upon which I have arranged a layer 24 of gravel for fine distribution. The lime 25 is evenly distributed in the chamber 26. The condition of its distribution may be widely varied, so as to assist in producing the desired solution. I prefer to arrange the lime in layer-like form on top of the gravel-bed 24. It will be observed that by using a layer of lime and by introducing the water beneath the layer impulsively and through a suitable distributer I thoroughly stir the lime without the use of any mechanical stirrer and without boring holes or channels through the lime, which latter method of supplying the solvent prevents attaining a satisfactory solution. After each impulse or rush of water through the pipe 21 the lime in the charging-chamber 26 settles back upon the distributing device and a clear solution of lime-water collects at the top of the chamber. Any suitable means may be employed to introduce the reagent into the tank 26.

I prefer to use a passage, such as $26^a$, with which a distributing device $26^b$ communicates. The latter evenly distributes the reagent over the gravel-bed in the tank. An injector $26^c$, with an inlet-pipe $26^d$ for the lime, is provided, the steam-pipe of the injector having a valve $26^e$ to shut off the steam when necessary. The valve $26^f$ closes communication with the tank 26. By means of a draw-off pipe $26^g$ and valve $26^h$ the sediment and spent lime may be withdrawn from the tank 26. The lime solution passes through the pipe 27 and discharges at 28 into the reservoir that receives the water to be purified. An air-pipe 29 is tapped into the pipe 27, so as to permit any entrained air to escape. It will be observed that by this means of transmitting the lime-water full advantage is gained of the impulsive action of the water which descends through the pipe 21. At each discharge of water through the pipe 21 the impulse of the moving column is transmitted through the chamber 26, and some of the lime-water is projected through the pipe 27, so as to dash upon and stir the water and the reagent contained in the reservoir 30. I preferably employ barium carbonate 31 at the bottom of the vessel 30. This reagent is very slightly soluble in pure water, but precipitates sulfates, sulfuric acid, and the like from the raw water containing these impurities. The raw water or liquid to be purified is introduced into the vessel 30 by means of an intermittently-operating device similar to the one already described. The raw water or other liquid flowing from the tank 1 passes through an adjustable regulator 31 (similar in construction to the one illustrated in Fig. 4) into a tank 32. A valve 33, connected by a stem 34 to the float 35, acts intermittently to supply the raw water or liquid to be purified through the pipe 36 into the reservoir 30. It will be seen that this means of introducing the raw water into the reservoir 30 materially assists in stirring up the barium carbonate or other reagent that is used and in mixing thoroughly the raw water with the reagents. It prevents the formation of any channels or holes through the reagent and stirs up all parts of the chemical.

The reservoir 30 may be widely varied in form, and its function may be widely different. In the form illustrated in the drawings the reservoir also acts as a decanter, as will be more fully described hereinafter. The raw water, having been thoroughly mixed with the chemicals and the impurities largely precipitated therefrom into the bottom of the tank 30, rises through the passage-way 37 and discharges at the mouth 38 over the filter-bed 39. The filtering material is preferably supported by perforated plates 40, and the filtered water is withdrawn from beneath the filter-bed by the pipe 41. The funnel 42 may be used for introducing the barium carbonate into the reservoir 30.

A pipe $30^a$, provided with a valve $30^b$, may be used for cleaning the reservoir 30 and discharging the sediment and reagents used from the reservoir.

In the embodiment of the invention illustrated in the drawings the mouth 38 of the passage-way 37 is symmetrically located with relation to the filter-bed and in the specific form of the invention illustrated is concentric thereto.

In the operation of the apparatus it will be seen that the water to be purified is introduced by means of the pipe 36, the lime solution is introduced into the reservoir 30 by means of the pipe 27, and the filtered water is removed by means of the pipe 41. Should the filter 39 become clogged or dirty, I provide an automatic apparatus for cleansing it. The form of this apparatus may be widely varied. As illustrated in the drawings, I make use of suitable siphons, one of which is rendered operative by the other. I prefer to withdraw the dirty water from the supply side of the filter, as follows: A siphon 43 is provided with an interior pipe 44, the mouth of which dips below the water contained in the open shallow trough 45, the latter forming a simple kind of seal. The outside pipe 46 of the siphon 43 is in communication with a passage 47, the mouth 48 of which projects into the upper part of the reservoir 30. A solid wall 49 separates the reservoir 30 from the filtering-chamber. If the filter should clog, the water-level will rise in the filtering-chamber 50 and will rise in the siphon 43 until it overflows at 51. The siphoning action will then begin and water will be withdrawn from the top of the filter-bed down through the passage 37 and out through the pipe 47, to be finally discharged at 45. A certain amount of the barium carbonate or other reagent that is used collects at the top or supply side of the filter-bed. As the water passes from the top of the filter-bed during the cleansing operation down the passage 37 this reagent will fall by gravity to the bottom of the reservoir 30, where it may again take part in the subsequent reactions. In order to insure the barium carbonate dropping to the point indicated and not being withdrawn with the waste water, the deflector 52 is provided, which obstructs the passage of the carbonate if it tries to escape through the pipe 47. It will be observed that by reason of the symmetrical arrangement of the mouth 38 of the passage 37 with relation to surrounding filter-bed the muddy water at the top of the filter is carried into the passage 37 uniformly and with an even flow and is likewise supplied uniformly to the filter. It will also be noted that by locating the pipe 48 or the intake for the siphon at a point remote from the filter-bed there is no local suction in the filter, and the barium carbonate may be separated from the dirty water before it passes out.

I prefer to supply a cleansing liquid to the delivery side of the filter, which in the form of the invention illustrated is the bottom of the filter, so as to thoroughly clean and wash it. The form of the cleansing apparatus may be widely varied. I have shown a siphon consisting of a central tube 53 and an outside casing 54. This siphon dips into the tank 1. The pipe 53 discharges into the space 55 beneath the filter-bed.

The siphon is set into operation by means controlled by the siphon 43. This means includes a means for exhausting the air from the siphon 54, so as to set it in action. The form of this exhausting means may be widely varied; but I preferably make use of a pipe 56, which connects the two siphons. When the siphon 43 starts to withdraw the liquid from the top of the tank 30, it will create a partial vacuum in the pipe 56, which partial vacuum will be sufficient to permit the liquid to rise in the tank 1 within the pipe 54, so as to overflow into the discharge-pipe 53 and start the action of the siphon for flushing the filter-bed. The water coming from the siphon 53 will pass up through the filter-bed and thoroughly cleanse it. The liquid drawn from the top of the filter-bed will pass out through the siphon 43. It is desirable that during this operation the outlet for the filtered water be closed. I therefore provide a valve $41^a$ in the pipe 41, which valve is preferably controlled by a suitable float 57. The rod 58 and lever 59 connect the valve-arm 60 to the float. When the level of the water rises in the filtering-tank 50, due to the clogging of the filter, the float 57 rises and shuts off the valve $41^a$ in the pipe 41, thus preventing the escape of the filtrate. The same float and valve operate to regulate the discharge of the filtrate. When the water-level sinks in the filtering-chamber 50, by reason of the too rapid discharge of the filtrate through pipe 41, the float 57 falls and the opening in the pipe 41 is proportionately closed by the valve $41^a$. This preserves a uniform level of water in the filtering-chamber 50.

The operation of my device will be evident from the foregoing description. Raw water is intermittently supplied and a measured quantity of lime-water is intermittently and impulsively supplied to the raw water contained in the reservoir 30. At this point the water having been freed from the carbonates is now freed from sulfuric acid and sulfates by the barium carbonate. The water then ascends through the open passage at the top of the decanter, passes down through the filter-bed, and is withdrawn at 41.

Should the filter clog, the flushing apparatus comes into action, as described above.

Fig. 7 illustrates a modification in which a siphon 70 acts to intermittently discharge the water from tank 72 instead of using a valve. The regulator 71 controls the rate of flow of water to the tank.

My invention in its broader aspects is not limited to the particular constructions and relative arrangements of the parts herein shown and described nor to any particular form of apparatus by which the invention may be carried into effect, as many changes may be made in the construction and relative arrangement of the parts as required to adapt the apparatus to the circumstances of the particular application of the invention or to meet the personal views of the mechanical engineer employed to carry the invention into effect without departing from the main principles of the invention and without sacrificing its chief advantages.

Having thus described my invention, what I claim, and desire to secure by Letters Patent, is—

1. In a water-purifying apparatus, the combination of means for receiving a reagent and means for intermittently and impulsively supplying water to the reagent in such a manner as to stir substantially the entire reagent substantially as described.

2. The combination of means for receiving a distributed reagent, and means for intermittently and impulsively supplying a liquid to the reagent in such a manner as to stir substantially the entire reagent, substantially as described.

3. The combination of means for receiving a reagent to be dissolved; means for intermittently and impulsively supplying the solvent to the reagent; and means for distributing said solvent before it reaches the reagent, substantially as described.

4. In a lime-charging apparatus, the combination of a charging-reservoir adapted to receive a layer of lime; distributing means supporting said layer; and means for intermittently and impulsively supplying water beneath said layer, substantially as described.

5. In a lime-charging apparatus, the combination of means for receiving the lime; distributing means for the solvent; and means for intermittently and impulsively supplying the solvent to the lime through the distributing means, substantially as described.

6. In a lime-saturater, the combination of a saturating-reservoir; means for supporting a layer of lime therein; means for intermittently and impulsively supplying the water to be saturated beneath said layer; and means for permitting the resulting solution to settle, substantially as described.

7. In a lime-saturater, the combination of a saturating-reservoir; distributing means for supporting a layer of lime within the reservoir; and means for impulsively supplying water beneath the layer, substantially as described.

8. In a lime-saturater, the combination of a chamber having means for supporting a distributed body of lime; and means for impulsively admitting water to said chamber below said supporting means, said supporting means being constructed to distribute the water through the layer of lime.

9. The combination of means for receiving a distributed reagent; means for intermittently and impulsively supplying a liquid to the reagent in such a manner as to stir substantially the entire reagent; a mixing-reservoir; and means for transmitting said impulse and some of the reagent to said reservoir, substantially as described.

10. In a lime-saturater, the combination of a saturating-reservoir; means for supporting a layer of lime therein; means for intermittently and impulsively supplying the water to be saturated beneath said layer; means for permitting the resulting solution to settle; a mixing-reservoir; and means for transmitting said impulse and some of the lime to said reservoir.

11. In a lime-saturater, the combination of a saturating-reservoir; means for supporting a layer of lime therein; means for intermittently and impulsively supplying the water to be saturated beneath said layer; means for permitting the resulting solution to settle; a mixing-reservoir; and means for transmitting said impulse and some of the lime-water to said reservoir, substantially as described.

12. The combination of means for receiving a distributed reagent; means for intermittently and impulsively supplying a liquid to the reagent in such a manner as to stir substantially the entire reagent; a reservoir adapted to contain another reagent; and means for transmitting said impulse and some of the first-named reagent to said reservoir, substantially as described.

13. In a lime-saturater, the combination of a saturating-reservoir; means for supporting a layer of lime therein; means for intermittently and impulsively supplying the water to be saturated beneath said layer; means for permitting the resulting solution to settle; a reservoir; means for supplying carbonate to said reservoir; and means for transmitting said impulse and some of the lime-water to said reservoir, substantially as described 14. The combination of means for receiving a distributed reagent; means for intermittently and impulsively supplying a liquid to the reagent in such a manner as to stir substantially the entire reagent; a reservoir; means for supplying carbonate to said reservoir; means for intermittently supplying raw water to be purified to said reservoir; and means for transmitting said impulse and some of the reagent to said reservoir, substantially as described.

15. The combination of means for receiving a layer of lime; means for intermittently and impulsively supplying a liquid to the lime in such manner as to stir the entire layer of lime; a reservoir; means for supplying carbonate to said reservoir; means for intermittently supplying raw water to be purified to said reservoir; and means for transmitting said impulse and some of the lime to said reservoir, substantially as described.

16. The combination of a filter, means for supplying a liquid charged with a reagent to the filter; means for delivering the filtrate therefrom; means for withdrawing liquid from the supply side of the filter; and means for separating the reagent from the liquid so withdrawn.

17. The combination of a filter; means for supplying a liquid charged with a reagent to the filter; means for delivering the filtrate therefrom; means for supplying liquid to the filter so as to flush it; and means for separating the reagent from the flushing liquid.

18. The combination of a filter; means for supplying liquid charged with a reagent to the filter; means for delivering the filtrate therefrom; means for admitting cleansing liquid to the delivery side of the filter; means for withdrawing liquid from the supply side of the filter; and means for separating the reagent from the liquid so withdrawn.

19. The combination of a filter-bed to which a reagent has been supplied; a siphon arranged to draw the liquid from the supply side of the filter-bed; and means for separating the reagent from the liquid so drawn.

20. The combination of a filter-bed to which a reagent has been supplied; means for supplying a cleansing liquid to the filter-bed; a siphon for withdrawing the cleansing liquid from the filter-bed; and means for separating the reagent from the liquid withdrawn from the filter-bed.

21. The combination of a filter to which a reagent has been supplied; means for withdrawing water from the filter; and means for separating the reagent from the water so withdrawn.

22. The combination of a filter to which a reagent has been supplied; a siphon for withdrawing water from the filter and means between the filter and the siphon for separating the reagent from the water so withdrawn.

23. The combination of a horizontal filter-bed to which a reagent has been supplied; means located remote from the surface of the filter-bed for withdrawing water from above the bed; and means for separating the reagent from the water so withdrawn.

24. The combination of a horizontal filter-bed to which a reagent has been supplied; means remote from the filter-bed for withdrawing water from above the bed; and means between the filter-bed and the water-withdrawing means for separating the reagent from the water so withdrawn.

25. The combination of a horizontal filter-bed to which a reagent has been supplied; means for admitting a cleansing liquid to said filter-bed; means including an element located symmetrically with relation to the bed for withdrawing water from above the bed; and means for separating the reagent from the water so withdrawn.

26. The combination of a horizontal filter-bed to which a reagent has been supplied and through which the water is forced by gravity; means including an element located symmetrically with relation to the bed for withdrawing water from above the filter-bed; a decanting-chamber into which the water so withdrawn is delivered; and means in said chamber for separating the reagent from the liquid withdrawn from above the filter.

27. The combination of a horizontal filter-bed to which a reagent has been supplied; means for withdrawing liquid from above the filter-bed; a decanting-chamber below the filter-bed into which water so withdrawn is delivered; and means in said chamber including a deflector for separating the reagent from the withdrawn water.

28. The combination of a horizontal filter-bed; a centrally-located passage for discharging water from the surface of the said bed; a chamber below said filter-bed; and a deflector in said chamber symmetrically located with relation to said passage.

29. The combination of a horizontal filter-bed; a discharge-passage having its mouth centrally located with relation to said filter-bed; a decanting-chamber with which said discharge-passage communicates; a discharge-passage for delivering liquid from the upper part of said decanting-chamber; and a deflector arranged within the decanting-chamber and between said discharge-passages.

30. The combination of a horizontal filter-bed; a discharge-passage having its discharge-mouth above said filter-bed and symmetrically located with relation thereto; a decanting-chamber below said filter-bed with which said discharge-passage communicates; means for withdrawing liquid from the upper part of said decanting-chamber; and a deflector between said discharge-passage and said withdrawing means.

31. The combination of a horizontal filter-bed; an upwardly-opening discharge-passage concentrically located with relation to said filter-bed for withdrawing water from above the filter-bed; a decanting-chamber arranged beneath said filter-bed; and a deflector in said decanting-chamber concentrically located with relation to said discharge-passage.

32. The combination of a horizontal filter-bed; an upwardly-opening discharge-passage concentrically located with relation to said filter-bed for withdrawing water from above the filter-bed; a decanting-chamber arranged beneath said filter-bed; a deflector in said decanting-chamber concentrically located with relation to said discharge-passage; and means for withdrawing liquid from said decanting-chamber at a point above said deflector.

33. The combination of a horizontal filter-bed; an upwardly-opening discharge-passage concentrically located with relation to said filter-bed for withdrawing water from above the filter-bed; a decanting-chamber arranged beneath said filter-bed; a deflector in said decanting-chamber concentrically located with relation to said discharge-passage; and means for intermittently withdrawing liquid from said decanting-chamber at a point above said deflector.

34. The combination of a horizontal filter-bed; an upwardly-opening discharge-passage concentrically located with relation to said filter-bed for withdrawing water from above the filter-bed; a decanting-chamber arranged beneath said filter-bed; a deflector in said decanting-chamber concentrically located with relation to said discharge-passage; and a siphon for withdrawing liquid from said decanting-chamber at a point above said deflector.

35. The combination of a filter-bed; a siphon for admitting a supply of liquid below the filter-bed; a siphon for withdrawing liquid from the supply side of said filter-bed; and means rendered operative by the liquid-withdrawing siphon for exhausting air from the liquid-admitting siphon, substantially as described.

36. The combination of a filter-bed; a siphon for admitting a supply of liquid below the filter-bed; a siphon for withdrawing liquid from the supply side of said filter-bed; and a passage communicating with said siphons whereby said liquid-admitting siphon is rendered operative by said liquid-withdrawing siphon, substantially as described.

37. The combination of a horizontal filter-bed; a decanting-chamber; a passage forming a communication between the top of said filter-bed and said decanting-chamber, said passage having its mouth concentrically located with relation to the filter-bed, and means for supplying a reagent through said passage to said decanting-chamber.

38. A water-purifying apparatus comprising a receptacle; a reagent-chamber in the lower part of said receptacle; a filter-chamber in the upper part of said receptacle; and a decanting-chamber located between said reagent-chamber and said filter-chamber.

39. A water-purifying apparatus comprising a receptacle; a reagent-chamber in the lower part of said receptacle; a filter-chamber in the upper part of said receptacle; a decanting-chamber located between said reagent-chamber and said filter-chamber; a passage forming a communication between the upper part of the reagent-chamber and the lower part of the decanting-chamber; and a passage forming a communication between the upper part of the decanting-chamber and the upper part of the filter-chamber.

40. In a water-purifying apparatus, a receptacle; a reagent-chamber in the lower part of said receptacle, a filter-chamber in the upper part of said receptacle; a decanting-chamber located between the reagent-chamber and the filter-chamber; a passage forming a communication between the upper part of the reagent-chamber and the lower part of the decanting-chamber; a passage forming communication between the upper part of the decanting-chamber and the filter-bed; means for supplying liquid to the lower part of the reagent-chamber; means for discharging liquid from the filter; and means for discharging liquid from the upper part of the decanting-chamber.

41. In a water-purifying apparatus, a receptacle; a reagent-chamber in the lower part of said receptacle, a filter-chamber in the upper part of said receptacle; a decanting-chamber located between the reagent-chamber and the filter-chamber; a passage forming a communication between the upper part of the reagent-chamber and the lower part of the decanting-chamber; a passage forming a communication between the upper part of the decanting-chamber and the filter-bed; means for supplying liquid to the lower part of the reagent-chamber; means for discharging liquid from the filter; means for discharging liquid from the upper part of the decanting-chamber; and a deflector arranged between the passage forming a communication between the decanting-chamber and the filter and the passage for discharging water from the decanting-chamber.

42. In a water-purifying apparatus, a chamber for receiving a reagent; means for supplying water to said chamber; inlet and outlet passages for said chamber; a passage for admitting the reagent to and discharging the reagent from said chamber; and means communicating with said passage for evenly distributing the reagent in said chamber.

43. In a water-purifying apparatus, a chamber for receiving a reagent; water inlet and outlet passages for said chamber; an injector for supplying reagent to said chamber; and means communicating with said injector for distributing the reagent in said chamber.

44. In a water-purifying apparatus, the combination of means for receiving a reagent, means for impulsively supplying liquid to the reagent, a valve for controlling said supply, and means for intermittently operating said valve, substantially as described.

45. In an apparatus for charging water with lime, the combination of means for receiving the lime, distributing means for the water, means for impulsively supplying water to the lime, a valve for controlling said supply, and means for intermittently operating said valve.

46. In a lime-saturater, the combination of a chamber having means for supporting a distributed body of lime, means for impulsively supplying water to said chamber below said supporting means, said supporting means being constructed to distribute the water through the body of lime, a valve for controlling said supply, and means for intermittently operating said valve.

47. In a lime-saturater, the combination of a saturating-reservoir, means for supporting a layer of lime therein, means for impulsively supplying the water to be saturated beneath said layer, a valve for controlling said supply, means for intermittently operating said valve, means for permitting the resulting solution to settle, a mixing-reservoir, and means for transmitting the impulse and some of the lime-water to said reservoir.

48. In a lime-saturater, the combination of a saturating-reservoir, means for supporting a layer of lime therein, means for impulsively supplying the water to be saturated beneath said layer, a valve for controlling said supply, means for intermittently operating said valve, means for permitting the resulting solution to settle, a reservoir, means for supplying carbonate to said reservoir, and means for transmitting the impulse and some of the lime-water to said reservoir.

49. In a water-purifying apparatus, the combination of means for supplying water to be purified to said apparatus, means for receiving a reagent, means for impulsively supplying liquid to the reagent, a valve for controlling said supply, an intermittently-operating float, and connections between the float and the valve.

50. In an apparatus for charging water with lime, the combination of means for receiving the lime, distributing means for the water, means for impulsively supplying water to the lime, a valve for controlling said supply, an intermittently-operating float, and connections between the float and the valve.

51. In a lime-saturater, the combination of a chamber having means for supporting a distributed body of lime, means for impulsively supplying water to said chamber below said supporting means, said supporting means being constructed to distribute the water through the body of lime, a valve for controlling said supply, an intermittently-operating float, and connections between the float and the valve.

52. In a lime-saturater, the combination of a saturating-reservoir, means for supporting a layer of lime therein, means for impulsively supplying the water to be saturated beneath the layer, a valve for controlling said supply, a float, connections between the float and the valve, means for permitting the resulting solution to settle, a mixing-reservoir, and means for transmitting the impulse and some of the lime-water to said reservoir.

53. In a lime-saturater, the combination of a saturating-reservoir, means for supporting a layer of lime therein, means for impulsively supplying the water to be saturated beneath said layer, a valve for controlling said supply, a float, connections between the float and the valve, means for permitting the resulting solution to settle, a reservoir, means for supplying carbonate to said reservoir, and means for transmitting the impulse and some of the lime-water to said reservoir.

54. In a water-purifying apparatus, the combination of means for supplying raw water to be purified to said apparatus, means for receiving a reagent, a tank for containing a supply of water, means for impulsively supplying the water to said reagent, and an intermittently-operating valve in said tank for controlling said supply of water.

55. In a water-purifying apparatus, the combination of means for supplying raw water to be purified to said apparatus, the combination of means for receiving a reagent, a tank for containing a supply of water, means for impulsively supplying water to said reagent, a valve in said tank for controlling said supply of water, an intermittently-operating float in said tank, and connections between said valve and said float.

56. In a water-purifying apparatus, the combination of means for supplying raw water to be purified to said apparatus, means for receiving a reagent, a tank, means for supplying water to said tank, means for regulating the flow of said water to said tank, and means for impulsively supplying said water to said reagent, substantially as described.

57. In a water-purifying apparatus, the combination of means for supplying raw water to be purified to said apparatus, means for receiving a reagent, a tank, means for supplying water to said tank, means for regulating the flow of said water to said tank, and an intermittently-operating valve in said tank for controlling said supply of water from said tank to said reagent.

58. In a water-purifying apparatus, the combination of means for supplying raw water to be purified to said apparatus, means for receiving a reagent, a tank, means for regulating the flow of said water to said tank, means for impulsively supplying said water to said reagent, a valve in said tank for controlling said supply of water, an intermittently-operating float in said tank, and connections between said valve and said float.

59. In a water-purifying apparatus, the combination of means for supplying raw water to be purified to said apparatus, means for receiving a reagent, a tank, means for supplying water to said tank, a valve for regulating the flow of water to said tank, means for adjusting said valve, and means for impulsively supplying said water to said reagent.

60. In a water-purifying apparatus, the combination of means for supplying raw water to be purified to said apparatus, means for receiving a reagent, a tank, means for supplying water to said tank, a valve for regulating the flow of water to said tank, means for adjusting said valve, and an intermittently-operating valve in said tank for controlling said supply of water.

61. In a water-purifying apparatus, the combination of means for supplying raw water to be purified to said apparatus, means for receiving a reagent, a tank, means for supplying water to said tank, a valve for regulating the flow of water to said tank, means for adjusting said valve, a valve in said tank for controlling said supply of water, an intermittently-operating float in said tank, and connections between the float and the valve.

62. In a water-purifying apparatus, the combination of means for supplying water to be purified to said apparatus, means for receiving a reagent adapted to precipitate sulfuric acid from the water to be purified and means for impulsively supplying water to said reagent in such a manner as to stir the reagent substantially as described.

63. In a water-purifying apparatus the combination of means for supplying water to be purified to said apparatus, means for receiving barium carbonate and means for impulsively supplying water to said reagent in such a manner as to stir the reagent substantially as described.

In testimony whereof I have signed my name to this specification in the presence of two subscribing witnesses.

HANS REISERT.

Witnesses:
  GUSTAV ELSNER,
  WILHELM KÜPPERS.